United States Patent Office 3,132,000
Patented May 5, 1964

3,132,000
PROCESS FOR THE PREPARATION OF HYDROUS FERRIC OXIDE
Robert F. Dwyer and Clair M. Birdsall, Tonawanda, N.Y., assignors to Union Carbide Corporation, a corporation of New York
No Drawing. Filed Nov. 28, 1960, Ser. No. 71,894
9 Claims. (Cl. 23—200)

This invention relates to hydrous ferric oxide and a process for its preparation.

It is well known that hydrogen exists in two molecular forms called ortho (nuclear spins parallel) and para (nuclear spins anti-parallel). In hydrogen gas at 300° K. the theoretical equilibrium concentrations exist, and the gas contains 3 parts ortho:1 part para. When this normal hydrogen is liquefied and stored, the 3:1 ortho:para ratio changes (during storage) to a predominantly para-containing mixture. The ortho to para conversion is accompanied by the evolution of about 330 calories per gram mole. Since this is greater than the heat of vaporization of hydrogen (218 calories per gram mole) the conversion of one gram mole of ortho hydrogen to para hydrogen supplies enough heat to result in the evaporation of more than one mole of liquid. In fact, measurements show that the uncatalyzed ortho to para conversion can cause the loss of 0.9 percent of the stored liquid hydrogen per hour when the liquid is about 68 mole percent ortho hydrogen. This rate of ortho to para conversion (and consequent evaporation of hydrogen) is not constant but varies directly with the second power of the ortho mole fraction. The loss rate when the ortho form predominates in the mixture is many times the loss due to heat leaks through modern storage containers. For efficient and successful storage of liquid hydrogen, the low temperature ortho:para equilibrium concentration should be produced and stored.

Various materials have been employed to catalyze the ortho to para hydrogen conversion. The mechanism of the heterogeneous catalysis may involve an actual interchange of atoms between molecules on the catalyst surface, and/or the change of nuclear spins by action of the magnetic fields of the catalyst system. Charcoal, reduced iron, paramagnetic rare earth oxides, paramagnetic salts, and chromic oxide supported on alumina have been used as catalysts as has a certain hydrated ferric oxide prepared in accordance with the teachings of U.S. Patent 2,943,917 to Weitzel et al. In general, the last mentioned material has been found more efficient than the other listed catalysts. However, this hydrated ferric oxide material has been found difficult to reproduce with a consistently high ortho-to-para conversion activity, and it has always been desirable to provide higher absolute activity values to achieve economies.

It is an object of this invention to provide an improved catalyst for converting ortho hydrogen to para hydrogen.

Another object is to provide a process for preparing an improved ortho-to-para hydrogen conversion catalyst.

A further object of this invention is to provide an ortho-to-para hydrogen conversion catalyst having a higher activity than heretofore attainable.

A still further object is to provide a process for preparing an ortho-to-para hydrogen conversion catalyst, which process provides a product of consistently high conversion activity.

Other objects and advantages of the invention will be apparent from the following disclosure and appended claims.

According to the process embodiment of this invention, the improved catalyst may be synthesized by first preparing an aqueous solution containing between about 5.5 and 6.5 weight percent sodium hydroxide, and an aqueous sol of ferric chloride by dissolving ferric chloride hexahydrate in a minimum amount of water at temperatures between about 85° and 95° C. followed by diluting the hydrate solution with sufficient additional hot water to provide an aqueous solution containing between about 11 and 13 weight percent ferric chloride hexahydrate. When prepared in this manner from good quality ferric chloride hexahydrate, the sol will be a clean, wine-red color. The sodium hydroxide aqueous solution is then added at temperatures between about 85° and 95° C. to the aqueous sol of ferric chloride and in sufficient quantities to be within about 2 percent of stoichiometric proportions. Mixing in this elevated temperature range has been found essential to attaining an improved product. Immediately, when the addition is complete, the resulting reaction solution is cooled to below about 35° C. and the hydrous ferric oxide precipitate is allowed to settle, preferably for at least 4 hours.

In a preferred embodiment the pH of the aqueous reactant mixture after mixing is adjusted so as to be in the range of about 8 to 10. Even though the quantities of the reactants are carefully determined, occasionaly the aqueous reactant mixture will be too alkaline or too acidic to produce a hydrous ferric oxide of the desired high level of activity. Among the factors which might cause the pH to fall outside of this range is the holding of the ferric chloride sol at its desired elevated temperature for an excessive period before addition of the aqueous sodium hydroxide. This can cause loss of hydrogen chloride; boiling conditions can also produce loss of hydrogen chloride from the sol. When the pH as determined by conventional means such as pH paper, is low, dilute aqueous sodium hydroxide is added and conversely when the pH is too high, concentrated aqueous hydrochloric acid is added as needed.

The supernatant liquor which will be about ⅓ of the total volume of the reactant solution is then replaced with water preferably until a total volume of about 1½ times the original volume is reached. The precipitate is agitated and allowed to resettle. This resettling step may take considerable time; times of over 16 hours have been necessary in some instances for good settling. The precipitate is rewashed by removing the supernatant liquor and preferably replacing it with ¼-total volume amounts of wash liquid at least 4 times. The cold aging of the reactant mixture and the washing steps as described are important to develop the physical properties such as high surface area and abrasion resistance of the final product.

When the washing is complete, the precipitate is filtered and allowed to dry in an ambient air atmosphere at ambient temperatures until shrinkage is complete. This is a slow step and may take up to 3 days or more. The drying is complete when the cake is hard, almost black in color, and shows a conchoidal fracture. At this point in the process, the dried precipitate has a moisture content of between about 17 and 22 weight percent.

The hydrous ferric oxide product is further dried at 137–143° C. for sufficient duration to reduce the water content of the product to below about 11% by weight, e.g. 24 hours, and prepared for use by grinding, sizing and activating. If the further drying step is initiated before sufficient water has been removed by air drying, the product is too soft. The activation treatment is well-known to those skilled in the art and consists of a vacuum treatment at a temperature below the final drying temperature followed by transfer to hydrogen in the absence of air.

The present catalyst when tested at 77° K. produces an approximately 42% para hydrogen mixture at a flow rate of 2.1 liters per minute per cubic centimeter of catalyst and is thus rated as 68% efficient in accordance with Formula 1 at this flow rate because the theoretical equilibrium concentration at 77° K. is 50.4% para hydrogen. Percent efficiency at 77° K.

$$= \frac{\text{percent para hydrogen} - 25}{25} \times 100 \quad (1)$$

At lower flow rates the efficiency is higher. The hydrous ferric oxide of this invention is superior in efficiency to all previously employed ortho-para catalysts at all but the lowest flow rates. At the latter conditions samples of certain iron oxide and hydrated chromium oxide catalysts showed equivalent efficiency but they were in fine powderous form and produced such a high pressure drop that they could not be tested at high flow rates.

The present invention will be more clearly understood by the following example illustrating the present process by which a product was obtained which was superior to commercially available hydrous iron oxide.

Ferric chloride hexahydrate, 136 grams, was dissolved by pouring a small amount of hot (93° C.) water on the crystals. After enough water has been added to dissolve the crystals the volume was made up to 1 liter with 93° C. water. To this ferric chloride sol was added 1 liter of hot (about 90° C.) sodium hydroxide solution containing 60.5 grams of NaOH per liter at a rate of 200 ml. per minute while stirring. A precipitate formed immediately. The beaker containing the reactant mix was placed in ice water and cooled. The supernatant liquor was decanted and replaced with a wash solution having a pH value of 8. Additional distilled water was added to make a total volume of about 3 liters. At this point the preparation was set aside for at least 60 hours, when the decantation and washing with pH 8 wash solution was repeated. Three additional such washings were done during the next 48 hours allowing for the settling of the precipitate after each change of solution. When it was noted that the precipitate was becoming peptized, the washings were stopped and the precipitate collected by suction filtration after which it was dried overnight in air at room temperature. When the precipitate had dried to the extent that when broken it showed a conchoidal fracture and was black in color, it was final-dried in an oven at 140° C.

The final product was crushed and screened yielding 15 grams of 30–50 mesh and 17.5 grams of fines.

The 30–50 mesh portion was analyzed with the following results:

| | Weight percent |
|---|---|
| Sodium | 0.86±0.05 |
| Chloride | 0.39±0.08 |
| Iron | 62.3±0.5 |
| Loss on ignition | 10.1±0.3 |

This material was found to possess a surface area of 203 square meters per gram after vacuum activation at 225° C. for 16 hours. During this activation treatment the hydrous ferric oxide product was found to lose 7 percent of its weight.

In a standardized evaluation test procedure based on the 4% thermal conductivity difference between 100% ortho and 100% para hydrogen and employing a Wheatstone bridge cell, this product was found to be 92 and 80 percent efficient as compared with 80 and 72 respectively for commercially available hydrous ferric oxide catalyst at space velocities of 1.15 and 1.7 liters per minute per cc. of catalyst. The latter was prepared in accordance with the teachings of U.S. Patent 2,943,917 to Weitzel et al. The higher activity of the catalyst of this invention is believed to reside at least in part in its higher surface area. For example, samples of the former hydrous ferric oxide catalyst have been found to provide surface areas of 120 to 150 square meters per gram as compared with 203 square meters per gram for the catalyst product of the previously described example.

The catalytic activity of hydrated ferric oxide of the present invention was compared with the previously referenced prior art material from the standpoint of space velocity. This is the volumes of hydrogen gas measured at S.T.P. per volumes of catalyst per minute that can be ortho-to-para converted to a predetermined extent, in this case 87% of equilibrium value. The results are reported in Table I.

TABLE I

Catalytic Activity of Hydrated Ferric Oxide Samples

| Sample: | Space velocity, cc./cc./min. |
|---|---|
| Material of this invention | 1200 |
| Prior art material | 430 |

It will be readily apparent from Table I that the material of this invention has a space velocity which is about 2.79 times that of the prior art material, and thus represents a very significant advancement of this art.

As previously discussed the surface area and magnetic properties of the catalyst may affect its activity. The amount of water, and the rate and temperature at which it is removed from the hydrous oxide during preparation has an important bearing on the hardness of the product and may determine a good gel structure for catalysis. The impurities, sodium and chloride, which may or may not affect activity, are believed to contribute to oxide hardness and nonfriability. The material is designated as hydrous ferric oxide because a definite formula for exact hydrate bonding is not postulated.

The composition of the present invention was also compared with the prior art hydrated ferric oxide material by differential thermal analysis. This is a technique whereby exothermic and endothermic changes in a sample are observed as the temperature of the sample is changed at a controlled rate. Table II is a compilation of the major peaks observed in the thermograms of a sample prepared by the present process and a prior art sample. The samples were heated from room temperature to 1000° C. in an argon stream.

TABLE II

Differential Thermal Analysis of Hydrated Ferric Oxide

| Sample | First Endotherm Temp., ° C. | Second Endotherm Temp., ° C. | Exotherm Temp., ° C. |
|---|---|---|---|
| Material of this invention | 100 | 230 | 530 |
| Prior art material | 90 | 250 | 420 |

The 100° C. endotherm is attributed to loss of absorbed water. The second endotherm is attributed to the loss of water from $\gamma Fe_2O_3 H_2O$ which is reported to occur in the 250°–300° C. range. The high temperature exotherm is attributed to the conversion of $\gamma Fe_2O_3$ to $\alpha Fe_2O_3$. This is the "Curie point" or glow point, where the ferromagnetic material is converted to paramagnetic. It is to be noted that the exotherm of the prior art material is considerably below that of the present material.

The present hydrous ferric oxide catalyst may be employed in several apparatus arrangements well-known to those skilled in the art. For example, the catalyst may be placed in a perforated capsule and suspended in the ortho hydrogen gas stream flowing to the liquefaction equipment. Alternatively, the catalyst capsule can be located in a liquid hydrogen storage container to effect the para conversion after the liquefaction step.

It will be obvious to those skilled in the art that the present invention is capable of various modifications, and we do not desire, therefore, to be restricted to the precise details described. For example, deuterium ($D_2$) exists in two molecular forms; at 300° K. the mixture consists of 2 parts ortho:1 part para. It is probable that the hydrous ferric oxide of the present invention would be effective to catalyze the production of ortho deuterium (stable modification at low temperature).

What is claimed is:

1. A process for the preparation of hydrous ferric oxide comprising the steps of preparing an aqueous solution containing between about 5.5 and 6.5 weight percent sodium hydroxide; preparing an aqueous sol of ferric chloride by dissolving ferric chloride hexahydrate in a minimum amount of water at temperatures between about 85 and 95° C., and thereafter diluting the solution with sufficient additional hot water at said temperatures to provide an aqueous solution containing between about 11 and 13 weight percent ferric chloride hexahydrate; adding the sodium hydroxide aqueous solution at temperatures between about 85 and 95° C. to said aqueous sol of ferric chloride and in sufficient quantities to be within about 2 percent of stoichiometric proportions; immediately on completion of the addition of said sodium hydroxide aqueous solution, cooling the resulting reaction solution to below about 35° C. and allowing the hydrous ferric oxide precipitate to settle; removing the supernatant liquor from said reaction solution and replacing such liquor with water; agitating the precipitate and allowing said precipitate to resettle; rewashing by removing said supernatant liquor and replacing such liquor with water; repeating said rewashing at least 3 times; filtering the rewashed precipitate and drying such precipitate as a hydrous ferric oxide product in an air atmosphere at ambient temperature until shrinkage is complete; and further drying such product at a temperature of between about 137 and 143° C. for sufficient duration to reduce the water content of the product to below about 11% by weight.

2. A process for the preparation of hydrous ferric oxide comprising the steps of preparing an aqueous solution containing between about 5.5 and 6.5 weight percent sodium hydroxide; preparing an aqueous sol of ferric chloride by dissolving ferric chloride hexahydrate in a minimum amount of water at temperatures between about 85 and 95° C., and thereafter diluting the solution with sufficient additional hot water at said temperatures to provide an aqueous solution containing between about 11 and 13 weight percent ferric chloride hexahydrate; adding the sodium hydroxide aqueous solution at temperatures between about 85 and 95° C. to said aqueous sol of ferric chloride and in sufficient quantities to be within about 2 percent of stoichiometric proportions; immediately on completion of the addition of said sodium hydroxide aqueous solution, cooling the resulting reaction solution to below about 35° C. and allowing the hydrous ferric oxide precipitate to settle for a period of at least 4 hours; removing the supernatant liquor from said reaction solution and replacing such liquor with water; agitating the precipitate and allowing said precipitate to resettle; rewashing by removing said supernatant liquor and replacing such liquor with water; repeating said rewashing at least 3 times; filtering the rewashed precipitate and drying such precipitate as a hydrous ferric oxide product in an air atmosphere at ambient temperature until shrinkage is complete; and further drying such product at a temperature of between about 137 and 143° C. for sufficient duration to reduce the water content of the product to below about 11% by weight.

3. A process for the preparation of hydrous ferric oxide comprising the steps of preparing an aqueous solution containing between about 5.5 and 6.5 weight percent sodium hydroxide; preparing an aqueous sol of ferric chloride by dissolving ferric chloride hexahydrate in a minimum amount of water at temperatures between about 85 and 95° C., and thereafter diluting the solution with sufficient additional hot water at said temperatures to provide an aqueous solution containing between about 11 and 13 weight percent ferric chloride hexahydrate; adding the sodium hydroxide aqueous solution at temperatures between about 85 and 95° C. to said aqueous sol of ferric chloride and in sufficient quantities to be within about 2 percent of stoichiometric proportions; immediately on completion of the addition of said sodium hydroxide aqueous solution, cooling the resulting reaction solution to below about 35° C. and allowing the hydrous ferric oxide precipitate to settle for a period of at least 4 hours; removing the supernatant liquor from said reaction solution and replacing such liquor with sufficient water until a total volume of about 1½ times the original volume of said reaction solution is obtained; agitating the precipitate and allowing said precipitate to resettle; rewashing by removing said supernatant liquor and replacing such liquor with sufficient water until a total volme of about ¼ of the original volume of said reaction solution is obtained; repeating said rewashing at least 3 times; filtering the rewashed precipitate and drying such precipitate as a hydrous ferric oxide product in an air atmosphere at ambient temperature until shrinkage is complete; and further drying such product at a temperature of between about 137 and 143° C. for sufficient duration to reduce the water content of the product to below about 11% by weight.

4. A process according to claim 3 in which a sodium hydroxide aqueous solution having a pH value of about 8 is employed for the washing and rewashing steps.

5. A process according to claim 3 in which said precipitate is rewashed no more than 4 times.

6. A process according to claim 3 in which the pH value of said reaction mixture is adjusted to between about 8 and 10.

7. A process according to claim 3 in which the pH value of said reaction mixture is adjusted to between about 8 and 10 by the addition of dilute aqueous sodium hydroxide.

8. A process according to claim 3 in which the pH value of said reaction mixture is adjusted to between about 8 and 10 by the addition of concentrated aqueous hydrochloric acid.

9. A process according to claim 3 in which said hydrous ferric oxide product is air dried until the moisture content of such product is between about 17 and 22 weight percent.

References Cited in the file of this patent

UNITED STATES PATENTS 2,943,917    Weitzel et al. _____ July 5, 1960

OTHER REFERENCES

Weitzel et al. in "The Review of Scientific Instruments," American Institute of Physics, New York, 1956, volume 27, No. 1, pages 57 and 58.

Mellor: Comprehensive Treatise on Inorganic and Theoretical Chemistry, Longmans, Green and Company, New York, volume XIII, part 2, pages 860 and 861 (1934); volume 14, part 3, pages 43 and 44 (1935).